2,799,692

N-ACYLATION OF p-AMINOPHENOLS

Willard J. Croxall and John Mirza, Elkhart, Ind., assignors to Miles Laboratories, Inc., Elkhart, Ind., a corporation of Indiana No Drawing. Application June 24, 1955,
Serial No. 517,936

3 Claims. (Cl. 260—404)

This invention relates to an improved method for preparing N-acyl-p-aminophenols. More particularly, this invention relates to a process for directly preparing light colored N-acylated p-aminophenols which are easily crystallized and purified.

The present invention follows the generally employed method of preparing N-acylated p-aminophenols by the condensation of an acid with the selected p-aminophenol. But it is toward the improvement of such condensation technique to which the invention is directed. Because the reaction between the acid and aminophenol is a condensation reaction, water-entraining solvents such as benzene, xylene and toluene are employed to remove the water as formed. However, it appears that the rather high temperatures required in the art to remove the water in this manner is a major factor contributing to the discoloration normally noted in these acylated aminophenols. This discoloration, or coloration as the case may be, is probably attributable to the presence of foreign products resulting from side reactions. Whatever the cause, the coloration is particularly undesirable inasmuch as the N-acylated p-aminophenols are widely used as antioxidants in clear, colorless materials such as resins, plastics and the like. Accordingly, to eliminate the undesirable colored constituents, various methods of recrystallization, distillation and solvent extraction have been employed with varying degrees of success. But even when successful in producing a pure product such methods are time-consuming and costly.

It is therefore an object of this invention to provide a method of producing N-acylated p-aminophenols in high purity. And it is a further object of this invention to provide a method of producing N-acylated p-aminophenols as pure products that are easily crystallized as white particles.

These and other related objects are achieved by our method of effecting condensation of the reactants which method blankets the reactants in an atmosphere of sulfur dioxide. The exact theory behind the action of the blanket of sulfur dioxide is not absolutely established but the fact that the sulfur dioxide atmosphere is in equilibrium with the liquid reactants might indicate that sulfurous acid in nascent form could have the purifying properties that are so clearly evident. Whatever its function may be, the sulfur dioxide atmosphere appears to possess the ability of eliminating the formation of side products produced either by direct reaction or by degradation of the formed products.

In the practice of this invention, as in the prior art, any of the various monocarboxylic acids of the so-called higher fatty acid family are generally employed as the acid reactant. With these higher fatty acids containing upwards of four carbon atoms as the acid reactant, the corresponding N-acylated p-aminophenols possess greater solubility and therefore wider application as antioxidant additives in the various organic compositions that tend to gradually oxidize in storage. However, it will be appreciated that the exact nature of the acyl substituent is not critical where it does not affect the condensation of the acid with the amine. In selecting the p-aminophenol substituent, either the unsubstituted phenol or the nuclear substituted phenols are suitable reactants within the scope of this invention.

To particularly emphasize and illustrate the novel effects of the use of a sulfur dioxide atmosphere according to this invention reference is made to the following examples:

Example I

A two liter resin flask was equipped with an anchor-type glass agitator, a Dean-Starke water trap carrying a condenser, a thermometer and a gas inlet tube for maintaining an atmosphere of $SO_2$ above the surface of the reaction mixture. The flask was charged with 109 g. (1.0 mole) of p-aminophenol, 200 g. of coconut fatty acid, which was a mixture of $C_{10}$, $C_{12}$, $C_{14}$, and $C_{16}$ fatty acids with lauric ($C_{12}$) acid predominating (the mixture having an acid number of 246.0 and a molecular weight of 228.0), 72 g. of toluene and 3.8 g. of powdered boric acid catalyst. The leg of the Dean-Starke trap was filled with 20 ml. of toluene and heating and agitation were started. A slow stream of sulfur dioxide was passed over the surface of the reactants. The charge was heated at 135–140° C., water being removed fairly rapidly at the beginning and more slowly as the reaction proceeded. A total of 18.5 ml. of water was collected in six hours.

The toluene was distilled at reduced pressure (15–20 mm.) and a maximum final temperature of 145° C. The residual melt was cooled slightly, and dissolved by adding 500 g. of 88% isopropanol. This solution was treated with 10 g. of activated powdered charcoal for 2½ hours at reflux; and filtered while still hot. An atmosphere of $SO_2$ was maintained throughout these operations. The charcoal coke was washed twice with 44 g. portions of hot 100% isopropanol. The filtrate and washings were transferred to a clean two liter resin flask and diluted with 200 ml. of hot water. With agitation and gradual cooling under a continuous atmosphere of $SO_2$, the product was allowed to precipitate. At 58° C., the dropwise addition of 532 ml. of water was begun, being completed in about one hour. Cooling was applied by means of an ice-bath, the temperature of the mass falling to 15° C.

The supply of sulfur dioxide was then shut off and the product collected on a 5-inch centrifuge and washed with 50% by volume of cold aqueous isopropanol. The material was dried to constant weight in an oven at 60–75°. There was obtained 242 g. (83.2% of theory based on p-aminophenol), of a white powder; melting point 124°–125°.

Example II

A similar experiment to the above was conducted with C. P. lauric acid under an atmosphere of $SO_2$. The product was obtained as a white crystalline material by means of only one crystallization in a yield of 85% of theory based on p-aminophenol.

Example III

The above experiment was conducted in the same manner but a blanket of sulfur dioxide was not maintained during the reaction or for the purification steps. There was obtained during the first precipitation a product which was very difficult to centrifuge and very dark in color. This material was then re-dissolved, worked as in Example I, but without maintaining an $SO_2$ blanket. The product on precipitation was still very dark and very hard to centrifuge. It required three more precipitations and centrifugations to obtain a product which was of suitable color. Difficulty was experienced in all of the centrifugation operations.

*Example IV*

Another experiment was run exactly like Example I, but a blanket of nitrogen was maintained in place of the $SO_2$. The product so obtained centrifuged very well, but on final drying the material was darker than that obtained in Example I. To obtain a suitable product further recrystallization was required.

*Example V*

A similar experiment was conducted using carbon dioxide as a blanketing gas. The results were the same as that when using nitrogen.

From the foregoing comparative examples, it can be seen that the use of a sulfur dioxide atmosphere, in which the N-acylation of p-aminophenol takes place, provides a unique method of obtaining lightly colored, high purity products. By this means, the desired degree of purity is obtainable with only one crystallization whereas the products obtained using a blanket of other inert gases required numerous crystallizations for purification.

Having thus described our invention, we claim:

1. In the N-acylation of a p-aminophenol by condensation with a higher fatty acid, the improvement which comprises maintaining the reaction mixture of p-aminophenol and acid in an atmosphere of sulfur dioxide during acylation.

2. In the N-acylation of a p-aminophenol by condensation with a higher fatty acid, the improvement which comprises placing the reaction mixture of p-aminophenol and acid in an atmosphere of sulfur dioxide, heating said reaction mixture to remove the water of condensation, cooling to crystallize the N-acyl-p-aminophenol and washing the resulting crystalline product, said heating, cooling and washing being done while maintaining said atmosphere of sulfur dioxide.

3. In the preparation of an N-acylated p-aminophenol by condensation of a higher fatty acid and p-aminophenol the improvement which comprises maintaining the reactants during the condensation period and the product during the purification step under a sulfur dioxide atmosphere.

References Cited in the file of this patent

UNITED STATES PATENTS 2,625,557    Cottle et al. _____ Jan. 13, 1953